(12) United States Patent
Sakakibara

(10) Patent No.: US 11,906,229 B2
(45) Date of Patent: Feb. 20, 2024

(54) ULTRASONIC BIN CONTROL IN AN ICE MACHINE

(71) Applicant: Hoshizaki America, Inc., Peachtree City, GA (US)

(72) Inventor: Hideki Sakakibara, Aichi (JP)

(73) Assignee: Hoshizaki America, Inc., Peachtree City, GA (US)

( * ) Notice: Subject to any disclaimer, the term of this patent is extended or adjusted under 35 U.S.C. 154(b) by 0 days.

(21) Appl. No.: 17/676,690

(22) Filed: Feb. 21, 2022

(65) Prior Publication Data

US 2022/0170682 A1    Jun. 2, 2022

Related U.S. Application Data

(63) Continuation of application No. 16/529,047, filed on Aug. 1, 2019, now Pat. No. 11,255,588.

(Continued)

(51) Int. Cl.
*F25C 1/12* (2006.01)
*F25C 5/187* (2018.01)
(Continued)

(52) U.S. Cl.
CPC ............. *F25C 1/12* (2013.01); *F25C 1/00* (2013.01); *F25C 5/182* (2013.01); *F25C 5/187* (2013.01); *F25C 1/25* (2018.01); *F25C 2400/12* (2013.01); *F25C 2600/04* (2013.01); *F25C 2700/02* (2013.01); *F25D 23/00* (2013.01);

(Continued)

(58) Field of Classification Search
CPC ....... F25C 2700/02; F25C 5/187; F25C 5/182
See application file for complete search history.

(56) References Cited

U.S. PATENT DOCUMENTS 4,798,232 A    1/1989  Stembridge et al.
5,060,484 A   10/1991  Bush et al.
(Continued)

FOREIGN PATENT DOCUMENTS

AU    2014221539 A1 *  8/2015  ............... A23L 2/54
AU    2014215568 A1 *  9/2015  ........... F04D 25/028
(Continued)

OTHER PUBLICATIONS

Sakakibara, Hideki; Applicant-Initiated Interview Summary for U.S. Appl. No. 16/529,047, filed Aug. 1, 2019, dated Aug. 9, 2021, 6 pgs.

(Continued)

*Primary Examiner* — Filip Zec
(74) *Attorney, Agent, or Firm* — Taylor English Duma LLP

(57) ABSTRACT

An ice machine includes: an ice maker including: an ultrasonic bin sensor mounted to a body; and a controller in electrical communication with the ultrasonic bin sensor and configured to control the ultrasonic bin sensor; and a storage bin coupled to the ice maker and sized to receive a mound of ice, a lens of the ultrasonic bin sensor facing a bottom of an interior cavity of the storage bin, the controller configured to process a return signal of the ultrasonic bin sensor to control a level of ice stored inside the storage bin, the controller further configured to apply a predetermined time delay to filter out a portion of the return signal that exceeds a threshold voltage but does not exceed the time delay.

24 Claims, 13 Drawing Sheets

Related U.S. Application Data

(60) Provisional application No. 62/714,412, filed on Aug. 3, 2018, provisional application No. 62/714,414, filed on Aug. 3, 2018.

(51) Int. Cl.
  *F25C 1/00* (2006.01)
  *F25C 5/182* (2018.01)
  *F25D 23/06* (2006.01)
  *F28D 21/00* (2006.01)
  *F25D 23/00* (2006.01)
  *F25C 1/25* (2018.01)

(52) U.S. Cl.
  CPC ............ *F25D 23/006* (2013.01); *F25D 23/06* (2013.01); *F25D 23/063* (2013.01); *F28D 21/00* (2013.01); *F28F 2275/085* (2013.01)

(56) References Cited

U.S. PATENT DOCUMENTS

| | | | |
|---|---|---|---|
| 5,095,754 | A | 3/1992 | Hsu et al. |
| 5,172,595 | A | 12/1992 | Bush et al. |
| 5,291,752 | A | 3/1994 | Alvarez et al. |
| 5,479,707 | A | 1/1996 | Alvarez et al. |
| 5,922,030 | A | 7/1999 | Shank et al. |
| 7,779,641 | B2 | 8/2010 | Lee et al. |
| 8,393,164 | B2 * | 3/2013 | Kim .................. F25C 5/187 62/73 |
| 8,545,113 | B2 | 10/2013 | Johnson et al. |
| 8,695,646 | B2 * | 4/2014 | Agam .................. G01S 15/87 141/94 |
| 8,857,198 | B2 | 10/2014 | Styn et al. |
| 8,959,939 | B2 * | 2/2015 | Kim .................. F25C 5/187 62/73 |
| 9,243,834 | B2 * | 1/2016 | Kim .................. F25D 21/02 |
| 9,517,441 | B2 * | 12/2016 | Jablonski .............. B01F 35/833 |
| 10,010,898 | B2 * | 7/2018 | Gasper .................. G01F 1/666 |
| 10,261,940 | B2 * | 4/2019 | Procyshyn ............ G06F 1/1632 |
| 11,255,588 | B2 | 2/2022 | Sakakibara |
| 11,591,205 | B2 * | 2/2023 | Bendig ................ B67D 1/0888 |
| 2008/0264090 | A1 | 10/2008 | Sowa et al. |
| 2009/0100847 | A1 | 4/2009 | Moon et al. |
| 2009/0165492 | A1 | 7/2009 | Wilson et al. |
| 2009/0251990 | A1 | 10/2009 | Preissler |
| 2010/0250005 | A1 | 9/2010 | Hawkes et al. |
| 2017/0075490 | A1 | 3/2017 | Liu et al. |
| 2020/0041190 | A1 | 2/2020 | Sakakibara |

FOREIGN PATENT DOCUMENTS

| | | | |
|---|---|---|---|
| BR | 8403129 | | 6/1985 |
| CA | 3054383 | A1 * | 8/2018 ........... A61B 5/7203 |
| CN | 102195466 | | 9/2011 |
| CN | 102348946 | A | 2/2012 |
| FR | 1548724 | | 12/1968 |
| FR | 2605402 | | 4/1988 |
| JP | S61149881 | | 7/1986 |
| JP | H11230652 | | 8/1999 |
| JP | 2000105115 | | 4/2000 |
| JP | 2013156223 | | 8/2013 |

OTHER PUBLICATIONS

Sakakibara, Hideki; Corrected Notice of Allowance for U.S. Appl. No. 16/529,047, filed Aug. 1, 2019, dated Nov. 8, 2021, 4 pgs.
Sakakibara, Hideki; Non-Final Office Action for U.S. Appl. No. 16/529,047, filed Aug. 1, 2019, dated May 11, 2021, 19 pgs.
Sakakibara, Hideki; Notice of Allowance for U.S. Appl. No. 16/529,047, filed Aug. 1, 2019, dated Oct. 12, 2021, 13 pgs.
Senix Corporation; Installation and Operating Instructions for ToughSonic® Series, published Apr. 12, 2016, 49 pgs.
Senix Corporation; ToughSonic 3 Level & Distance Sensor Data Sheet, published Dec. 1, 2015, 2 pgs.
Sakakibara, Hideki; Office Action for Japanese patent application No. 2019-143380, filed Aug. 2, 2019, dated Jun. 10, 2021, 12 pgs.
Sakakibara, Hideki; Extended European Search Report for serial No. 19189917.8, filed Aug. 2, 2019, dated Dec. 6, 2019, 6 pgs.
Sakakibara, Hideki; Office Action for European patent application No. 19189917.8, filed Aug. 2, 2019, dated Mar. 4, 2021, 4 pgs.
Sakakibara, Hideki; Office Action for Chinese patent application No. 201910707257.3, filed Aug. 1, 2019, dated Feb. 4, 2023, 18 pgs.
Sakakibara, Hideki; Notice of Allowance for Chinese patent application No. 201910707257.3, filed Aug. 1, 2019, dated Nov. 13, 2023, 5 pgs.
Scotsman; Instructions for Vari-Smart Control; revised Aug. 2012, 5 pgs.
Scotsman; Article entitled: N0922 Prodigy Plus; available on the WayBack machine as early as Sep. 22, 2020, located at <https://web.archive.org/web/20200922180641/https://www.scotsman-ice.com/products/ENERGY-STAR-Certified/Modular/N0922-Prodigy-Plus>, 2 pgs.

* cited by examiner

| Application | Bin Control Ice Level Settings ||
|---|---|---|
| | Bin Control Controller Setting | Ice Detection Distance From Bin Control Lens |
| Ultrasonic Sensor | 1 | 10" (203 mm) |
| Default; Standard Ice Storage Bin | 2 | 12" (305 mm) |
| Dispenser Unit and Standard Ice Storage Bin | 3 | 16" (406 mm) |
| Dispenser Unit and Standard Ice Storage Bin | 4<br>5 | 20" (508 mm)<br>24" (610 mm) |

ULTRASONIC BIN CONTROL IN AN ICE MACHINE

REFERENCE TO RELATED APPLICATIONS

This application is a continuation of U.S. application Ser. No. 16/529,047, filed Aug. 1, 2019, issuing into U.S. Pat. No. 11,255,588 on Feb. 22, 2022, which claims the benefit of U.S. Provisional Application No. 62/714,412, filed Aug. 3, 2018, and U.S. Provisional Application No. 62/714,414, filed Aug. 3, 2018, each of which is hereby specifically incorporated by reference herein in its entirety.

TECHNICAL FIELD

This disclosure relates to ice machines. More specifically, this disclosure relates to systems comprising ultrasonic devices for detecting the amount of ice produced and stored inside ice machines.

BACKGROUND

Ice level detectors can be useful in an ice machine with an ice storage bin to control when an ice maker of the ice machine turns on and off. More specifically, when the ice storage bin is empty, an electronic circuit comprising a level detector can electronically signal to a controller of the ice maker to begin ice production. Once the storage bin becomes full of ice, the level detector can electronically signal the controller to halt ice production. Mechanical and thermostatic level detectors, common in commercial ice machines, can detect the presence of ice inside a storage bin by making physical contact with the ice inside the storage bin.

While not typical in ice machines, an ultrasonic sensor can be used generally to detect the depth—or corresponding height—of a material. Such a sensor typically can comprise a transmitter, a receiver and one or more transducers. The transmitter can emit an electrical signal, which can be converted to acoustic energy by the transducer—an acoustic "pulse." The acoustic energy signal can then travel until it is reflected back to the ultrasonic sensor by the surface of the measured material. The transducer can then convert the reflected signal or return signal into an electrical signal. The travel time between the transmission and reception of the acoustic energy signal can determine the depth of the measured material. An ultrasonic sensor, however, cannot itself distinguish between the presence of different materials and for reasons described herein can be an inflexible or unreliable method of level detection in certain environments, at least by itself.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is an ice machine comprising: an ice maker comprising: an ultrasonic bin sensor mounted to a body; and a controller in electrical communication with the ultrasonic bin sensor and configured to control the ultrasonic bin sensor; and a storage bin coupled to the ice maker and sized to receive ice, a lens of the ultrasonic bin sensor facing a bottom of an interior cavity of the storage bin, the controller configured to process a return signal of the ultrasonic bin sensor to control a level of the ice stored inside the storage bin, the controller further configured to apply a predetermined time delay to filter out a portion of the return signal that exceeds a threshold voltage but does not exceed the time delay.

Also disclosed is a bin control system for an ice machine, the system comprising: an ultrasonic bin sensor comprising a body defining a first end and a second end distal from the first end, the first end comprising a lens; and a controller in electrical communication with the ultrasonic bin sensor and configured to control the ultrasonic bin sensor, the controller configured to process a return signal of the ultrasonic bin sensor to control a level of ice stored inside a storage bin, the controller configured to apply a predetermined time delay to filter out a portion of the return signal that exceeds a threshold voltage but does not exceed the time delay.

Also disclosed is a method of using an ice machine, the method comprising: transmitting an acoustic pulse from an ultrasonic bin sensor of an ice maker of the ice machine into a storage bin of the ice machine, the ultrasonic bin sensor mounted to a body of the ice maker, the acoustic pulse initiated by the ultrasonic bin sensor in electrical communication with the a controller; receiving a return signal resulting from a reflection of the acoustic pulse off surfaces of materials present inside an interior cavity of the ice machine within range of the ultrasonic bin sensor; converting the return signal from an acoustic signal into an electrical signal; changing an ice production setting of the ice machine based on the electrical signal; filtering out a portion of the return signal that exceeds a threshold voltage but does not exceed a predetermined time delay; and switching off production of the ice maker of the ice machine when a portion of the return signal does exceed a threshold voltage and does exceed the predetermined time delay.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

Figure 1:
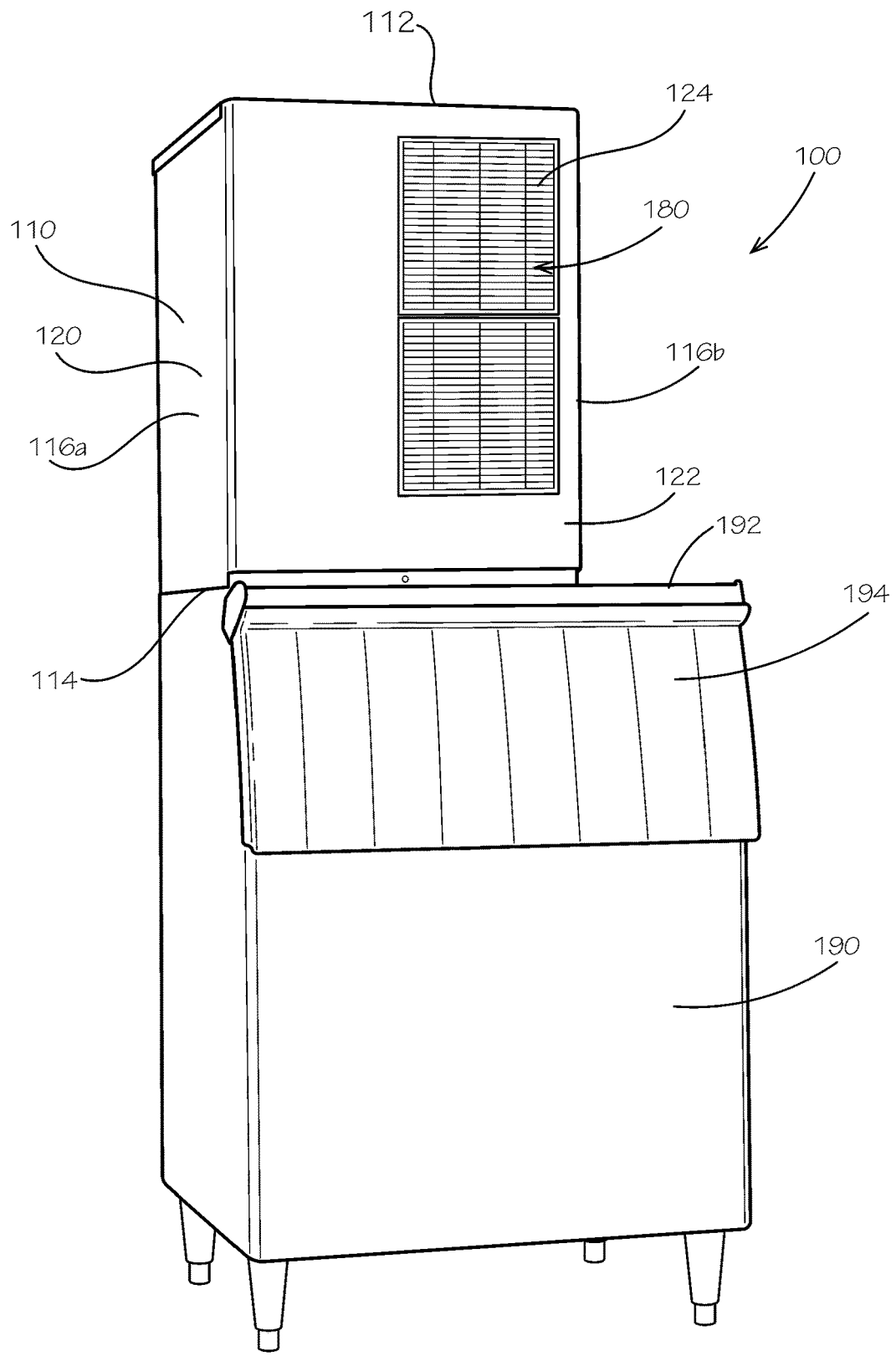
FIG. 1 is a front perspective view of an ice machine comprising an ice maker and a storage bin in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. The phrase "at least one of A and B" as used herein means "only A, only B, or both A and B"; while the phrase "one of A and B" means "A or B."

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of an ice machine nearest to and occupied by a user of the ice machine; "rear" is that end that is opposite or distal the front; "left" is that which is to the left of or facing left from a person standing in front of the ice machine and facing towards the front; and "right" is that which is to the right of or facing right from that same person. "Horizontal" or "horizontal orientation" describes that which is in a plane extending from left to right and aligned with the horizon. "Vertical" or "vertical orientation" describes that which is in a plane that is angled at 90 degrees to the horizontal.

Disclosed is an ice machine with an ultrasonic bin sensor and associated methods, systems, devices, and various apparatus. The ice machine can comprise an ice maker and a storage bin. It would be understood by one of skill in the art that the disclosed ice machine is described in but a few exemplary aspects among many. No particular terminology or description should be considered limiting on the disclosure or the scope of any claims issuing therefrom.

FIG. 1 is a front perspective view of an ice machine 100 in accordance with one aspect of the present disclosure. The ice machine 100 can comprise an ice maker 110 and a storage bin 190. The ice maker 110 can be configured to produce ice which can be fed by gravity downwards into the storage bin 190. The storage bin 190 can be insulated to maintain cold temperatures within the bit storage compartment to prevent the ice from melting. In some aspects, the storage bin 190 can be refrigerated, and in other aspects, the storage bin 190 can be unrefrigerated. The storage bin 190 can define an interior cavity formed by interior walls thereof.

The ice maker 110 can comprise an outer casing 120, which can be configured to enclose the ice maker 110 and its internal components. As shown, the outer casing can comprise a front panel assembly 122. The front panel assembly 122 can extend from a top maker end 112 to a bottom maker end 114 of the ice maker 110, and from a left maker side 116a to a right maker side 116b of the ice maker 110. The front panel assembly 122 can define an air inlet opening 180 and can comprise an air filter 124. The air inlet opening 180 and the air filter 124 can be configured to provide ventilation for the ice maker 110 in the form of clean air from outside the ice maker 110.

The storage bin 190 can define a top bin end 192, on which the bottom maker end 114 of the ice maker 110 can be mounted. The storage bin 190 can comprise a bin door 194 located proximate to the top bin end 192, and the bin door 194 can provide access to a bin storage compartment (not shown) defined within the storage bin 190.

Figure 2A:
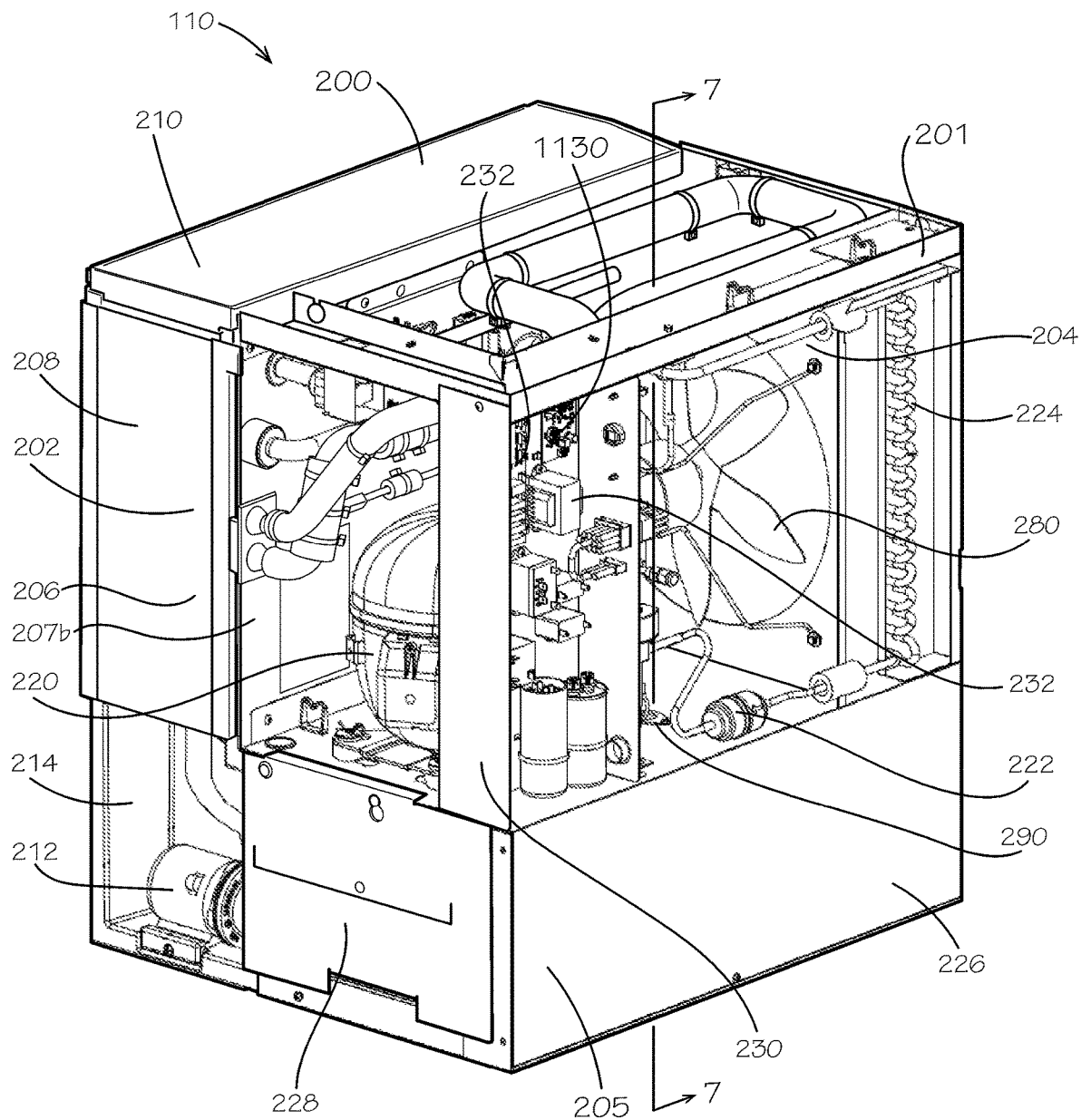
FIG. 2A is a front perspective view of the ice maker of FIG. 1 with an outer casing of the ice maker removed and showing an ultrasonic bin sensor.

FIG. 2A is a front perspective view of the ice maker 110 of FIG. 1 with the outer casing 120 (shown in FIG. 1) removed. In the present aspect, the ice maker 110 can be an air-cooled model, which can be cooled by circulating air through the outer casing 120, such as through the air inlet opening 180 (shown in FIG. 1). In some aspects, the ice maker 110 can be a water-cooled model or can coupled to a remote condensing unit for cooling. In the present aspect, the ice maker 110 can comprise a fan assembly 280, which can be configured to circulate air through the ice maker 110. Beneath or inside the outer casing 120, the ice maker 110 and a body 200 thereof can be compartmentalized into a wet compartment 202 and a dry compartment 204 and can further comprise a frame 201 and a base case 205. The wet compartment 202 can be primarily defined by an evaporator case 206, which can be insulated. The evaporator case 206 can enclose the majority of the components of a water circuit 450 (shown in FIG. 3) of the ice maker 110, which can be configured to form ice from liquid water delivered to and circulating through the ice maker 110. An evaporator compartment 306 (shown in FIG. 2B) of the evaporator casing 206 can be insulated. The evaporator case 206 can comprise a removable front insulation 208 and a removable top insulation 210, for example and without limitation, which can partially enclose and insulate the evaporator compartment 306. Either of the front insulation 208 or the top insulation 210 can be a panel or an insulation panel. Additionally, a tank 214 and evaporator walls 207a,b (207a shown in FIG. 2B) of the evaporator case 206 can be insulated.

The water circuit 450 can comprise a water pump 212, which can be mounted on or adjacent to the tank 214 in a location external to the evaporator compartment 306. A portion of the tank 214 enclosing the water pump 212 can be uninsulated. The tank 214 can be positioned beneath the evaporator walls 207a,b. The water pump 212 can be configured to pump water from the tank 214 upwards into the evaporation compartment where the water can be formed into ice.

Within the dry compartment 204, the majority of the components of a refrigeration circuit 400 (shown in FIG. 3) of the ice maker 110 can be enclosed, including a compressor 220, a drier 222, and a condenser 224, for example and without limitation. The compressor 220 can be mounted to a compressor base 226, which can comprise a horizontal compressor base panel to which the compressor can be more directly mounted. The compressor base 226 can comprise a base case cover 228. Within the dry compartment 204, refrigerant flowing through the refrigeration circuit 400 can be compressed by the compressor 220 and then cooled into a liquid state in the condenser 224 before being fed through an expansion device 240 (shown in FIG. 3), such as a thermostatic expansion valve, before being fed into an evaporator 310 housed inside the evaporator compartment 306. Additionally, a control box 230 of the ice maker 110, which can comprise a main controller 232 and a bin controller 1130, can be housed within the dry compartment 204. Either of the main controller 232 and the bin controller 1130 can comprise a control board as shown. An ultrasonic bin sensor 290 can be installed from within the dry compartment 204 and can extend through the compressor base 226. For example and without limitation, the ultrasonic bin sensor 290 can be or comprise a sensor bearing model number TK0143-000 and available from Audiowell Electronics (Guangdong) Co., Ltd. of Guangdong, China.

Figure 2B:
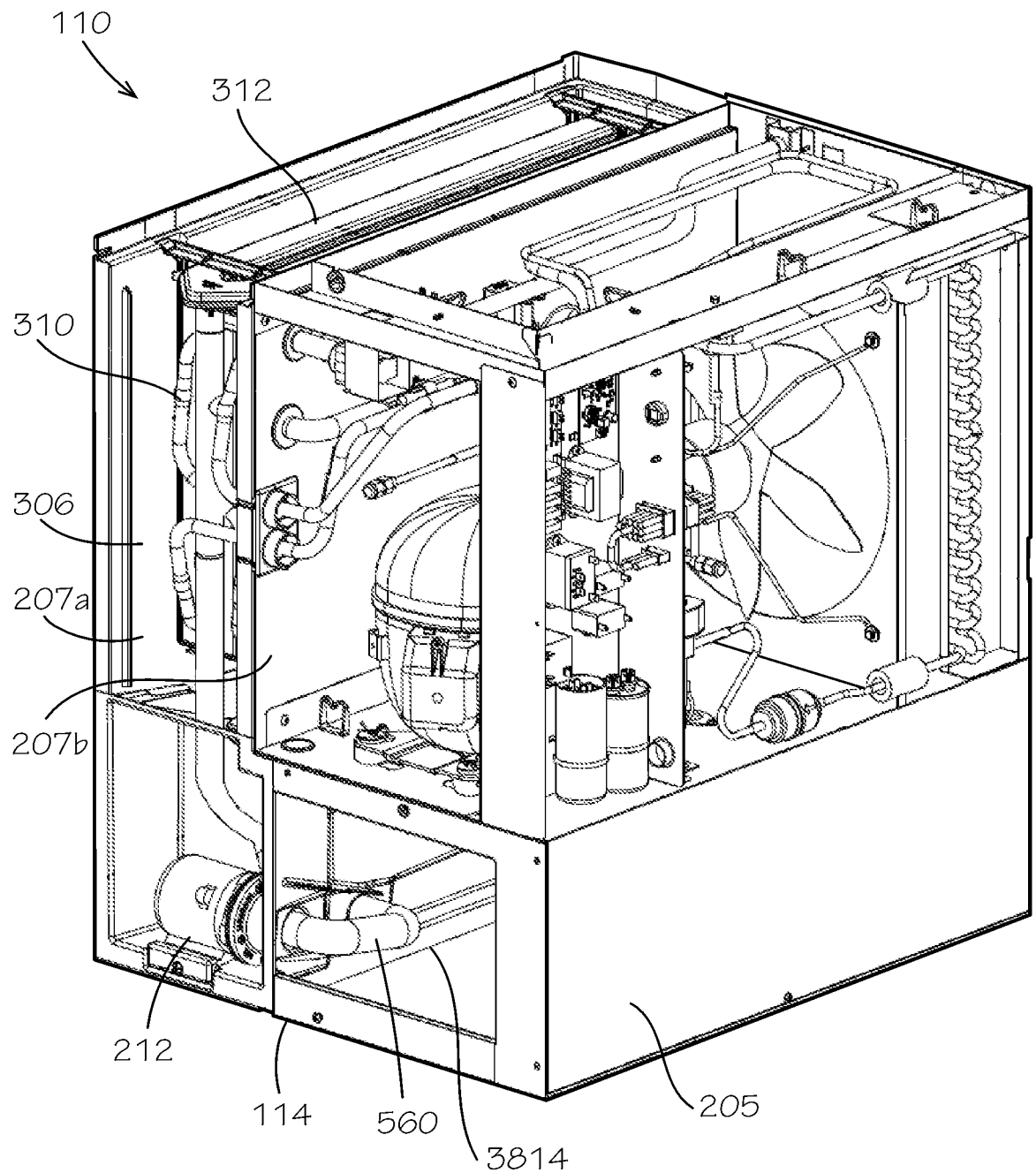
FIG. 2B is a front perspective view of the ice maker of FIG. 1 with a front insulation and top insulation of an evaporator case of the ice maker a base case cover of a compressor base of the ice maker further removed.

FIG. 2B is a front perspective view of the ice maker 110 of FIG. 2 with the front insulation 208 and top insulation 210 of the evaporator case 206 and the base case cover 228 of the compressor base 226 further removed. With the front insulation 208 and the top insulation 210 removed, the evaporator compartment 306 can be exposed. The evaporator 310 and a spray tube 312 can be enclosed within the evaporator compartment 306 between the evaporator walls 207a,b.

The refrigeration circuit 400 can comprise the evaporator 310, and the liquid refrigerant can evaporate to a gaseous phase within the evaporator 310, thereby cooling the evaporator compartment 306 below the freezing temperature of water. Liquid water can be pumped by the water pump 212 up to the spray tube 312, where the liquid water can be sprayed towards the evaporator 310 to form ice. A suction hose 560 can connect the water pump 212 to the tank 214 to provide a source of water from which to produce the ice. The body 200 and specifically at least the base case 205 can define a bottom opening 3814 at the bottom maker end 114 of the ice maker 110.

Figure 3:
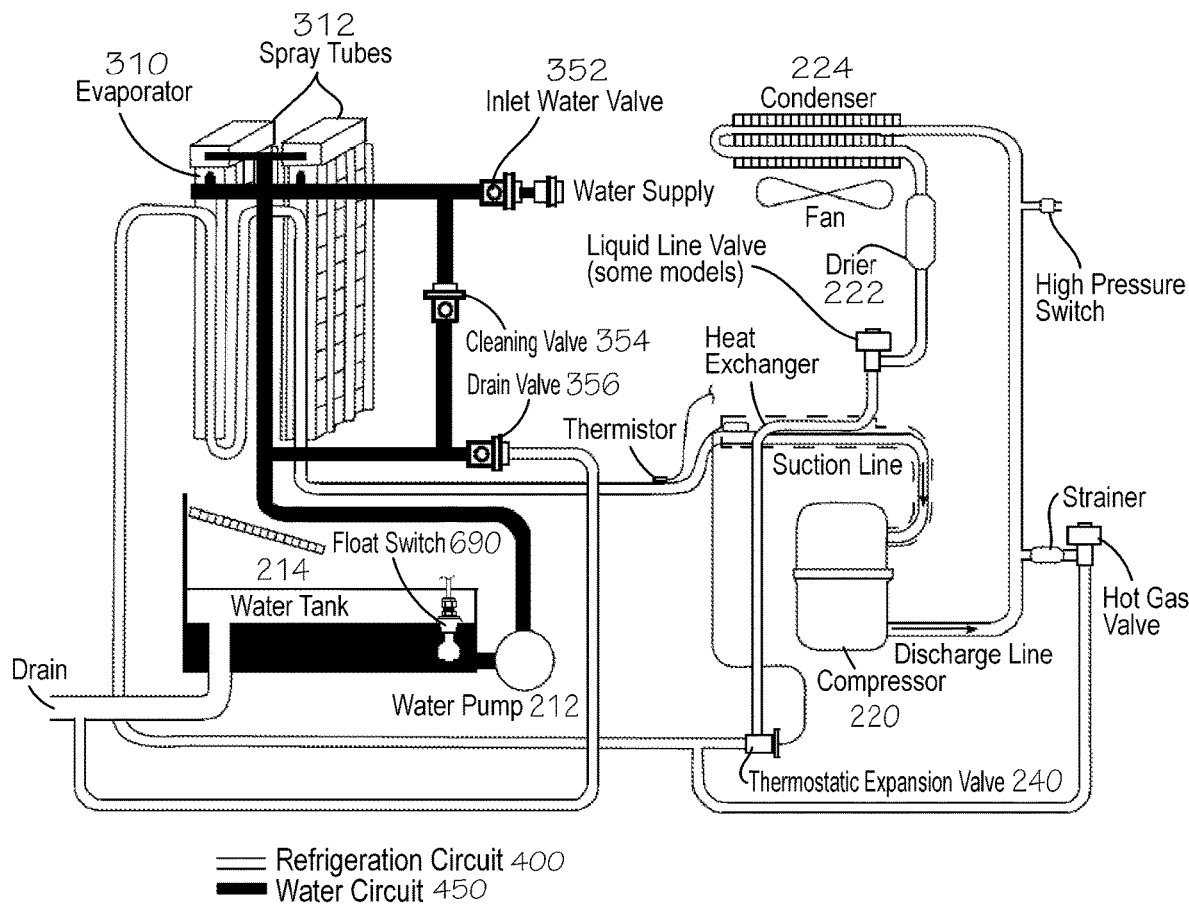
FIG. 3 is a circuit diagram showing a refrigeration circuit and a water circuit of the ice maker of FIG. 1.

FIG. 3 is a circuit diagram showing the interaction and interconnections between each of various components of the refrigeration circuit 400 and each of various components of the water circuit 450 of the ice maker 110 of FIG. 1. As shown, the water circuit 450 can further comprise an inlet water valve 352, a cleaning valve 354, and a drain valve 356.

Figure 4:
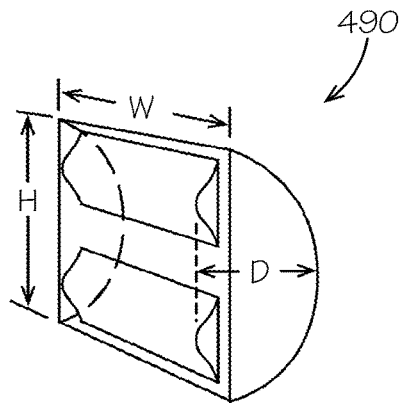
FIG. 4 is a perspective view of an exemplary ice cube produced by the ice maker of FIG. 1.

FIG. 4 shows a perspective view of the ice cube 490 in one exemplary aspect. In some aspects, as shown, the ice cube 490 can define a crescent shape, at least in part. In some aspects, the ice cube 490 can define a non-crescent shape. The ice cube 490 can define a height H, a width W, and a depth D. In some aspects, the height H can measure approximately 1.5 inches (approximately 38.1 millimeters), the width W can measure approximately 1.125 inches (approximately 28.6 mm), and the depth D can measure approximately 0.5 inches (approximately 12.7 mm). In other aspects, the ice cube 490 can measure smaller or larger in any dimension and can have a variable shape such that the ice cubes 490 are not identical.

Figure 7:
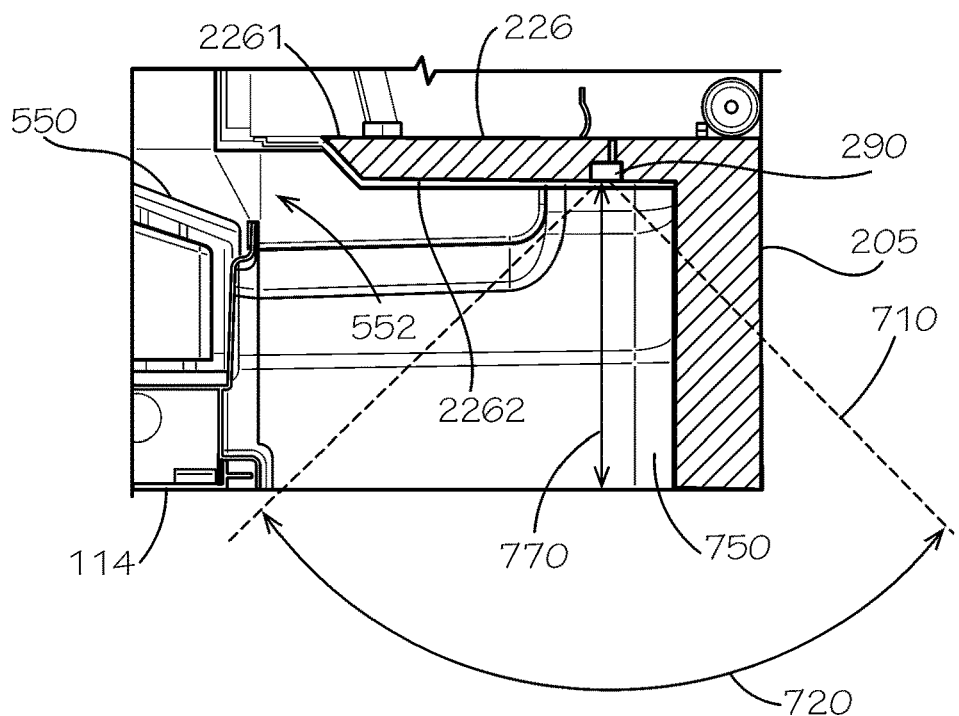
FIG. 7 is a detail sectional view of the ice maker of FIG. 2 taken from line 7-7 of FIG. 2A showing the ultrasonic bin sensor of FIG. 2A.

Positioned under the evaporator 310, the cube guide 550 (shown in FIG. 7) can be configured to guide the ice cubes 490 coming out of the evaporator case 206 downwards under the force of gravity and out of the cube opening 552 (shown in FIG. 7). The ice cubes 490 coming through the cube opening 552 can be ejected underneath the compressor base 226 (shown in FIG. 2A). The ice maker 110 (shown in FIG. 1) can be positioned over the storage bin 190 (shown in FIG. 1) so that an opening (not shown) of the storage bin 190 can be aligned underneath the compressor base 226. The ice cubes 490 falling from the cube opening 552 can fall out underneath the compressor base 226 and into the opening of the storage bin 190 to fill the storage bin 190.

Figure 5:
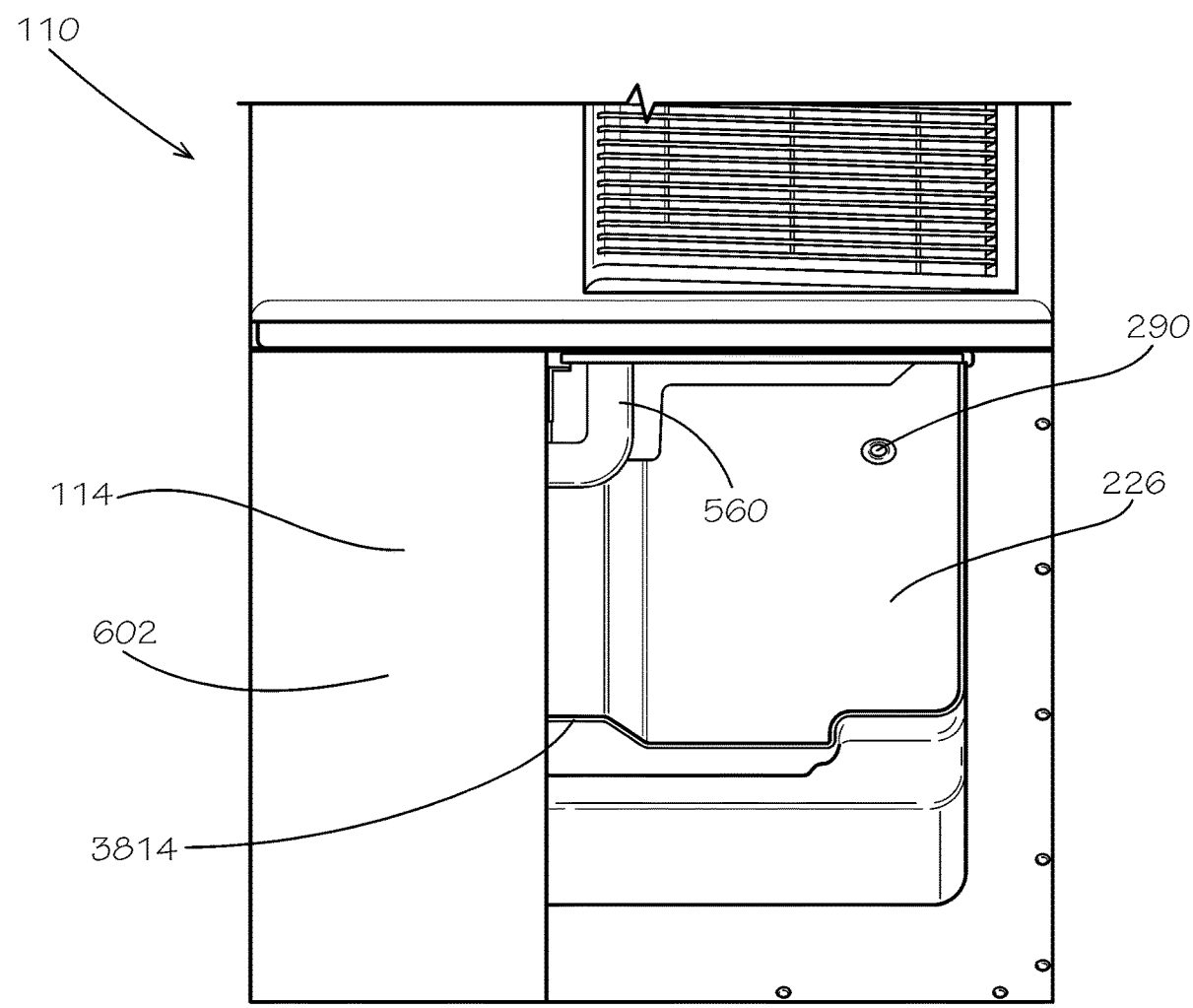
FIG. 5 is a bottom perspective view of the bottom maker end of the ice maker of FIG. 1 showing the ultrasonic bin sensor of FIG. 2A.

FIG. 5 is a bottom perspective view of the bottom maker end 114 of the ice maker 110 of FIG. 1. As shown, the tank base 602 and the base case 205 can together define the bottom maker end 114 and the bottom opening 3814. The bottom opening 3814 can be aligned with an opening (not shown) in the top bin end 192 (shown in FIG. 1) of the storage bin 190 (shown in FIG. 1). The ice cubes 490 produced by the ice maker 110 can fall through the bottom opening 3814 and into storage bin 190. The ultrasonic bin sensor 290 can extend through the compressor base 226 and be positioned above the bottom opening 3814. The ultrasonic bin sensor 290 can transmit ultrasonic waves downwards through the bottom opening 3814 and into the storage bin 190 in order to measure the level of the ice cubes 490 within the storage bin 190, as previously discussed.

Existing ice machines typically use a level detector—sometimes referred to as a bin control—positioned within the storage bin 190 to measure the level of the mound of ice cubes 490 within the storage bin 190. The level detector is typically a mechanical type, which can comprise an arm or paddle that is lifted by the rising level of the ice cubes 490, or a thermostatic type, which can comprise a bulb that thermally senses the physical presence of the ice cubes 490. Both the mechanical and the thermostatic types of level detectors or bin controls can be prone to malfunction, such as by accumulation of ice inside or around the level detector even when the storage bin 190 is not sufficiently full. Additionally, by positioning the level detector within the storage bin, which typically requires positioning the level detector below the bottom maker end 114, the level detector can be exposed to intentional tampering or accidental damage from users opening the storage bin. In any case, the level detector of the mechanical or thermostatic type must generally be installed in the field and cannot generally be practically installed in the factory. Further, the level detector can require an electrical switch to operate, and the storage bin is a cold and wet environment that can produce malfunctions within the electrical components. Additionally, the level detector can require the use of exposed wiring inside the storage bin 190.

By positioning the ultrasonic bin sensor 290 within the ice maker 110 and above the bottom opening 3814, the ultrasonic bin sensor 290 can be concealed from sight of a user accessing the storage bin 190, thereby making it a less likely target for tampering or other damage. Additionally, the ultrasonic bin sensor 290 can be positioned above the bottom maker end 114 and out of the storage bin 190, which can protect the ultrasonic bin sensor 290 from accidental damage, such as an impact with an ice bucket or ice scoop by a user retrieving ice from the storage bin 190. The electronic connection of the ultrasonic bin sensor 290 can also be positioned within the dry compartment 204 (shown in FIG. 2A) of the ice maker 110, which can be both ventilated and protected from water and ice, thereby reducing the likelihood of electrical component failure.

Figure 6:
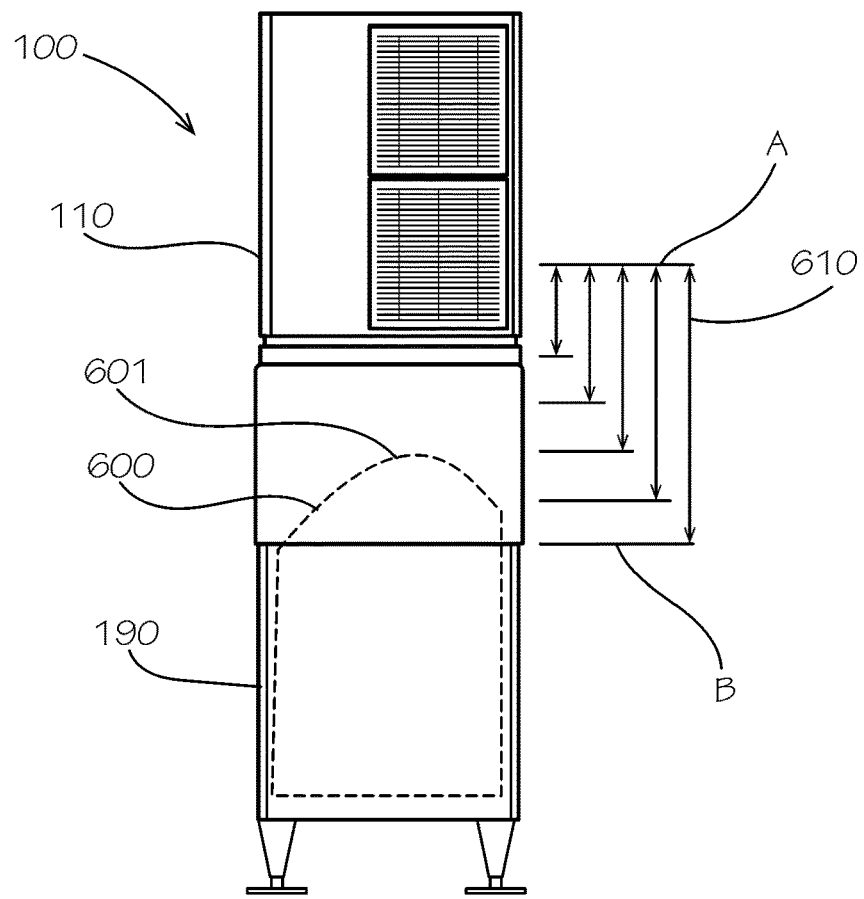
FIG. 6 is a front view of the ice machine of FIG. 1 showing a mound of ice cubes such as, for example and without limitation, the ice cube of FIG. 4 and various settings of a distance between a level position A defined by an outlet of the ultrasonic bin sensor of FIG. 2A and a level position B defined by the level of the mound of ice cubes.

As shown in FIG. 6, the ultrasonic bin sensor 290 can be configured to monitor a level of a top end 601 of a mound 600 of the ice cubes 490 accumulated within the storage bin 190. The ultrasonic bin sensor 290 can act as a proximity sensor by transmitting ultrasonic waves downwards towards the ice and receiving the ultrasonic waves that reflect off the ice cubes 490. The distance 610 from a level position A defined by an outlet of the ultrasonic bin sensor 290 to a level position B defined by the level of the ice cubes 490 can be determined from the travel times of the returning ultrasonic waves, which can be referred to as the return signal or return signals and can measure as short as 6 milliseconds or less. The ultrasonic bin sensor 290 can be in electronic communication with the control box 230 and specifically the main controller 232. Once the level of the ice cubes 490 in the storage bin 190 reaches a shut-off height, which can be a predetermined value as desired and set by a technician or a user of the ice maker 110 or even left as set at the factory, a signal from the ultrasonic bin sensor 290 can be received by the main controller 232, and the main controller 232 can cease the ice making process, thereby stopping further production of the ice cubes 490. As the ice melts or ice is removed from the storage bin 190, the level can reach a refill height. Once the level of the ice cubes 490 within the storage bin 190 reaches the refill height, the ultrasonic bin sensor 290 can send a signal to the main controller 232, and the main controller 232 can resume the ice making process to refill the storage bin 190 with the ice cubes 490. The refill height can be a predetermined value as desired and set by a technician or a user of the ice maker 110, or the refill height can be programmed into and controlled separately by the bin controller 1130 (shown in FIG. 11), which can be positioned in the control box 230 or elsewhere.

FIG. 7 shows the relative position of the ultrasonic bin sensor 290 in the ice maker 110. More specifically, the ultrasonic bin sensor 290 can be installed between an upper surface 2261 and a lower surface 2262 of the compressor base 226, which can be considered part of the base case 205. More specifically, in some aspects, a lens 1430 (shown in FIG. 16) of the ultrasonic bin sensor 290 can be offset by an offset distance 770 of 8 inches from the bottom maker end 114 of the ice maker 110, which will tend to maximize protection of the ultrasonic bin sensor 290 by not positioning it proximate to the storage bin 190 and anything else that might contact and even impact the bottom maker end 114 of the ice maker 110. In other aspects, the offset distance 770 can be zero or can be another distance. As disclosed herein, however, especially when but not only when the ultrasonic bin sensor 290 is moved away from the bottom maker end 114 of the ice maker 110 and without one or more of the improvements disclosed herein, the ultrasonic bin sensor 290 or the bin controller 1130 can confuse water droplets and other substances on surfaces of the ice machine 100 as ice. The ultrasonic bin sensor 290, which can be a piezo ultrasonic sensor comprising a piezo element, can emit a high frequency signal. In some aspects, the signal emitted by the ultrasonic bin sensor can have a frequency of 60 KHz. In some aspects, the frequency can be above or below 60 KHz. In some aspects, for example and without limitation, the frequency can be at least 55 kHz. In some aspects, the frequency can be at least 60 kHz. In some aspects, the frequency can be between 55 and 80 kHz. In some aspects, the frequency can be greater than 80 kHz with the caveat that increasing the frequency can increase a variability in sensor performance. Among other specifications, an echo sensitivity of the ultrasonic bin sensor can be 80 millivolts, and a capacitance can be 1650 picofarads.

The signal emitted by the ultrasonic bin sensor 290 can define a viewing cone 710, which can have the shape of a three-dimensional cone, defining a viewing angle 720. The viewing cone 710 of the ultrasonic bin sensor 290 can also be the "directivity" of the ultrasonic bin sensor 290. The viewing cone 710 can originate at or proximate to a first end 1415 (shown in FIG. 14) of the ultrasonic bin sensor 290, which can receive or comprise a lens 1430 (shown in FIG. 14) of the ultrasonic bin sensor 290. In some aspects, the viewing angle 720 of the viewing cone 710 can be 80 degrees. In other aspects, the viewing angle 720 of the viewing cone 710 can be less than 80 degrees, although it can be advantageous for the viewing angle 720 to not be so small or narrow as to affect the ability of the ultrasonic bin sensor 290 to properly "see" the ice inside the storage bin 190. In other aspects, the viewing angle 720 of the viewing cone 710 can be higher than 80 degrees, although for reasons that will be described below it can be advantageous for the viewing angle 720 to not be so great that the viewing cone 710 will intersect with any portion of the ice maker 110 presenting a surface that can reflect a transmission signal of the ultrasonic bin sensor 290 back to the ultrasonic bin sensor 290. In some aspects, the viewing angle 720 can have an angular tolerance of between 5, 10, 15, or 20 degrees, wherein the viewing angle 720 can measure a predetermined or set viewing angle plus or minus the tolerance. In some aspects, the viewing angle 720 can have an angular tolerance of any other value. In some aspects, the position of the ultrasonic bin sensor 290 can cause geometry of the ice maker 110 or the storage bin 190 to fall within the viewing cone 710. For example and without limitation, an inner wall 750 of the compressor base 226 and the base case 205 or any other inner wall or wall of the ice maker 110 or the storage bin 190 can fall within the viewing cone 710. As described above, the ice cubes 490 will generally form the mound 600, which will define the top end 601, which can be the highest point of the mound 600. The viewing cone 710 of the ultrasonic bin sensor 290 can "see" ice that is not directly below the sensor and so can view even the top end 601 or close enough to the top end 601 to initiate a timely change in the ice production setting.

Figure 8:
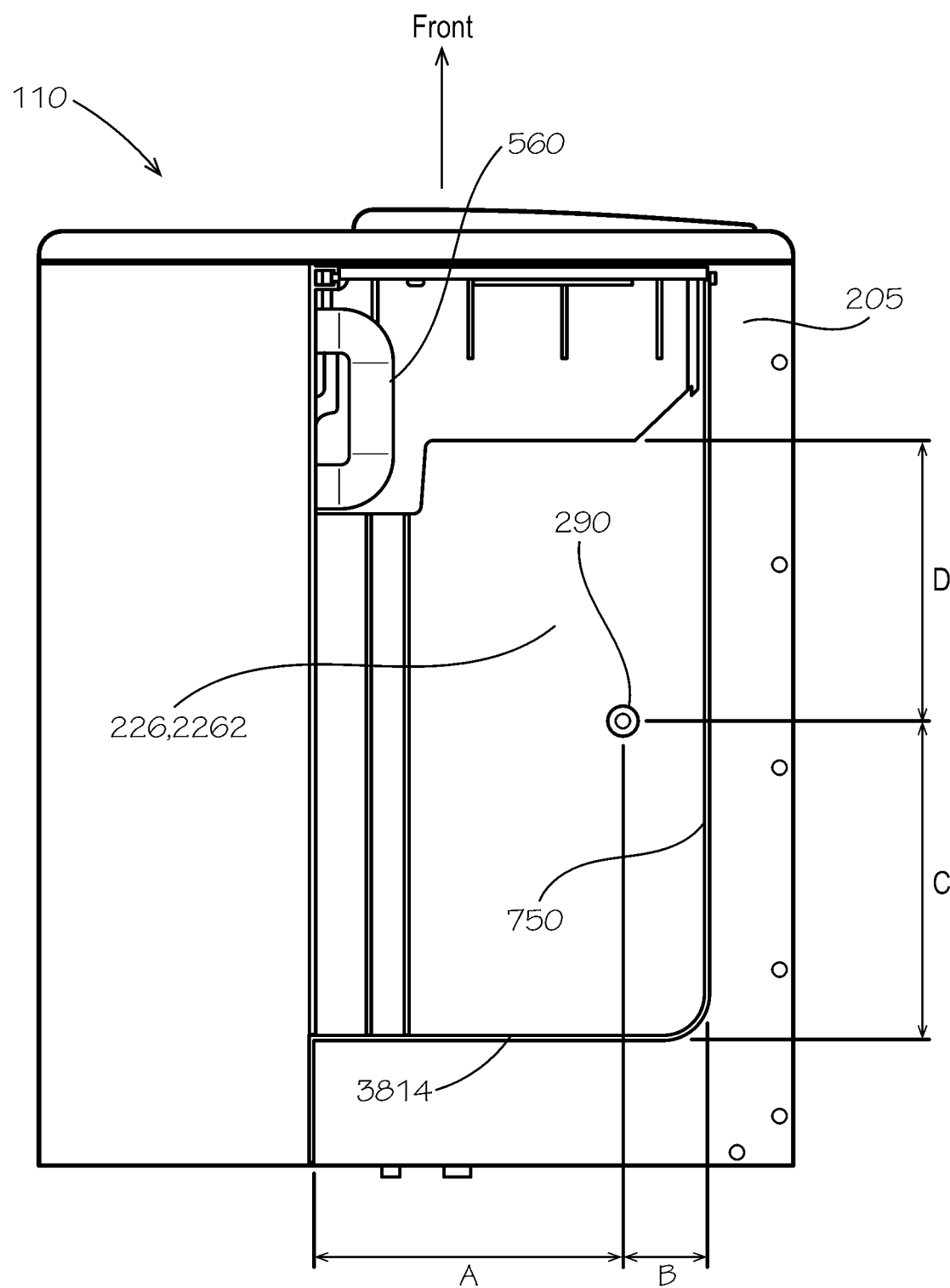
FIG. 8 is a bottom view of the ice maker of FIG. 1.

As shown in FIG. 8, the ultrasonic bin sensor 290 can be positioned in an opening (not shown) defined in the lower surface 2262 of the compressor base 226. Dimensions A, B, C, and D can more specifically define the position of the ultrasonic bin sensor 290 with respect to surrounding geometry of the ice maker 110 including the bottom opening 3814. The ultrasonic bin sensor can be positioned inside a shape formed by the bottom opening 3814 when viewed from the bottom maker end 114 of the ice maker 110. In some aspects, on a typical ice maker 110 it can be advantageous for the dimensions C and D to measure between about 203 mm and about 254 mm (between about 8 and about 10 inches or approximately halfway front to back in the bottom opening 3814. In one particular size model, as shown, the dimension C can measure 230 mm (9.1 inches) and the dimension D can measure 209 mm (8.2 inches). In some aspects, to yield manufacturability, serviceability, and other benefits, it can be advantageous to position the ultrasonic bin sensor 290 where space exists between components of the refrigerant circuit 400 in the aforementioned opening defined not only in the lower surface 2262 but also defined in and extending to the upper surface 2261 (shown in FIG. 7) of the compressor base 226. While the dimension B can fall within a range of values and be positioned close to the inner wall 750, it can be advantageous for the dimension A to great enough that the viewing cone 710 does not intersect with any portion of the ice maker 110 presenting a surface that can reflect a transmission signal of the ultrasonic bin sensor 290 back to the ultrasonic bin sensor 290 (such as, for example and without limitation, the suction hose 560). In one particular size model, as shown and sold as model number KM-660MAJ available from Hoshizaki America, Inc., the dimension A can measure 228 mm (9.0 inches). In yet other aspects, the ultrasonic bin sensor 290 can be positioned above the storage bin 190 without attaching the ultrasonic bin sensor 290 to the ice maker 110 using, for example and without limitation, a mounting surface of the storage bin 190 or another surrounding structure.

Figure 9:
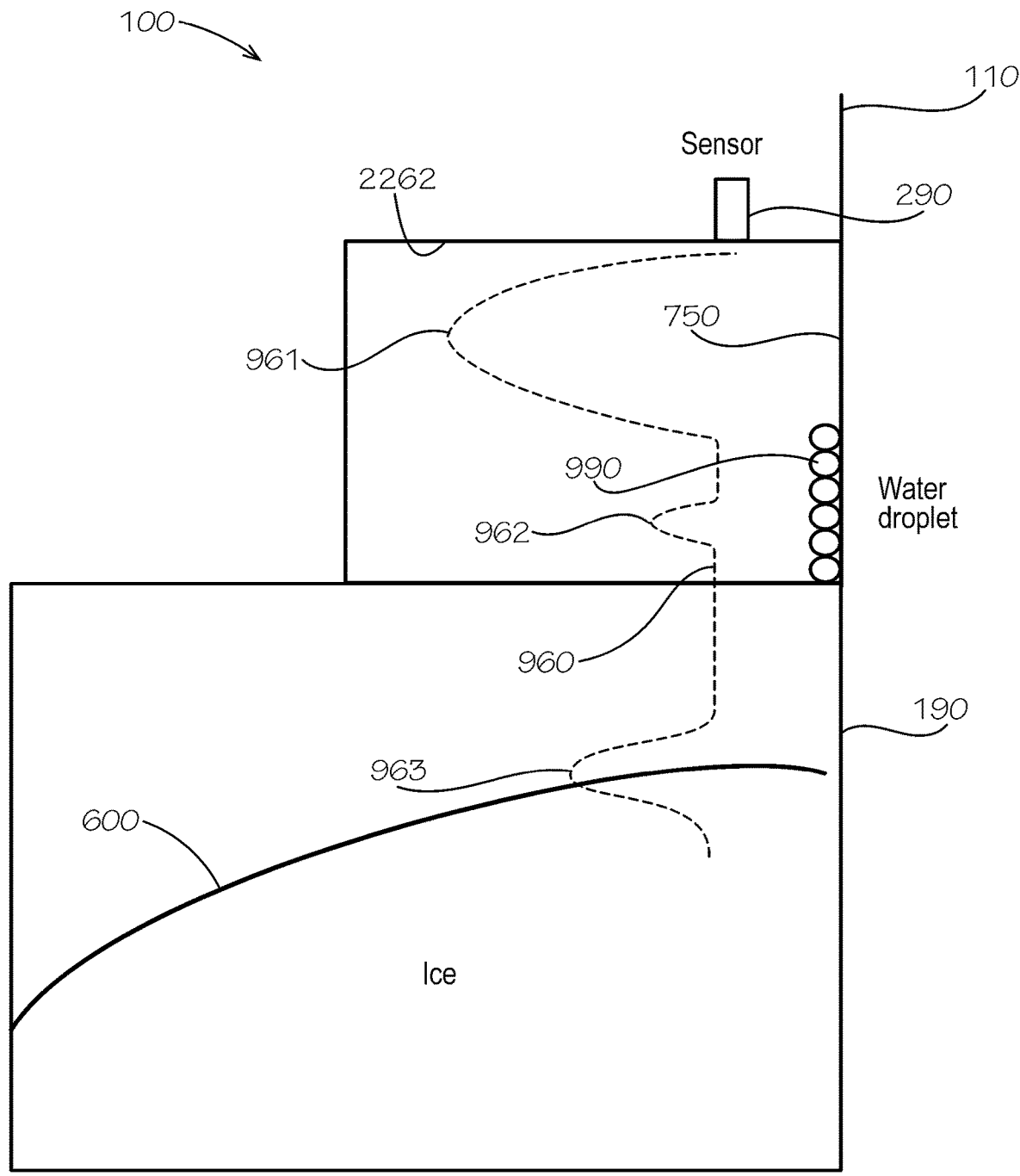
FIG. 9 is a schematic representation of the ice maker of FIG. 1 with a return signal of the ultrasonic bin sensor of FIG. 2A superimposed thereon.

When the inner wall 750 of the ice maker 110 is clean and dry, any ultrasonic signal hitting the inner wall 750 can simply reflect off the inner wall 750 and continue downward into the storage bin 190 below and not reflect back towards the ultrasonic bin sensor 290. In some aspects, however, as shown in FIG. 9, a surface of the inner wall 750 can be covered with a substance 990 able to reflect a return signal 960 back towards the ultrasonic bin sensor 290. For example and without limitation, a surface of the inner wall 750 can be covered at least partially with moisture. As shown, the moisture can be in the form of water droplets 990, which can form when, for example and without limitation, the ice cubes 490 fall into the storage bin 190 and cause water to splash up against a portion of the inner wall 750 within the viewing cone 710. In other aspects, inadequate cleaning can cause contamination to form on the inner wall 750 within the viewing cone 710. In some aspects, for example and due to inadequate cleaning, the surface of the inner wall 750 can be at least partially covered with "slime," which can form over time in environments where, for example, bread is made and the yeast used in the bread-making process can cause bacteria growth manifesting itself in the form of a soft and/or sticky residue on the inner wall 750. In some aspects, again due to inadequate cleaning, the surface of the inner wall 750 can be at least partially covered with mold, which can form over time in the moist and dark environment that can typically be present inside the storage bin 190. In some aspects, the surface of the inner wall 750 can be at least partially covered with scale, which can form from minerals in "hard" water found in some installation environments manifesting itself in the form of a harder residue on the inner wall 750. In some aspects, a vertical or horizontal surface or edge of a wall of the storage bin 190 (including, for example and without limitation, the wall of a dispenser) can fall within the viewing cone 710, including where a footprint of the ice maker 110 is either larger than or offset towards the outside from the top bin end 192 (shown in FIG. 1) of the storage bin 190.

As also shown in FIG. 9, the return signal 960 can be shown graphically by its strength (e.g., as measured in voltage) with respect to a time from which a transmission signal is sent (e.g., as measured in seconds). Such a time measurement can and generally will correspond to a physical distance from the ultrasonic bin sensor 290 to the source of a particular component of the return signal 960, i.e., the object "seen" by the ultrasonic bin sensor 290 and reflected in that particular component of the return signal 960. For example, a peak 961 of the return signal 960, which as shown can be nearest to the ultrasonic bin sensor 290, can simply be a transmission signal created by the ultrasonic bin sensor 290 (i.e., the original ultrasonic "pulse") that the ultrasonic bin sensor 290 detects as an element of the return signal 960. A peak 963 of the return signal 960 can be formed by a portion of the ultrasonic pulse that reflects off the ice cubes 490 forming the mound 600 inside the storage bin 190. Between the peaks 961 and 963, another peak can form such as the peak 962 caused by the presence of the substance 990 on the inner wall 750. The transmission signal as it leaves the ultrasonic bin sensor 290, similarly as reflected in FIG. 15, can measure, for example and without limitation, approximately 2.5V. At a test distance of 30 inches away from the ultrasonic bin sensor 290 the return signal 960 and specifically the peak 963 reflecting of the ice cubes 490 forming the mound 600 can measure approximately 1.0 V. When processing the return signal 960, the controller 1130 can use an analog comparator that compares a measured voltage to a threshold voltage value 1010 (shown in FIG. 10A).

Figure 10A:
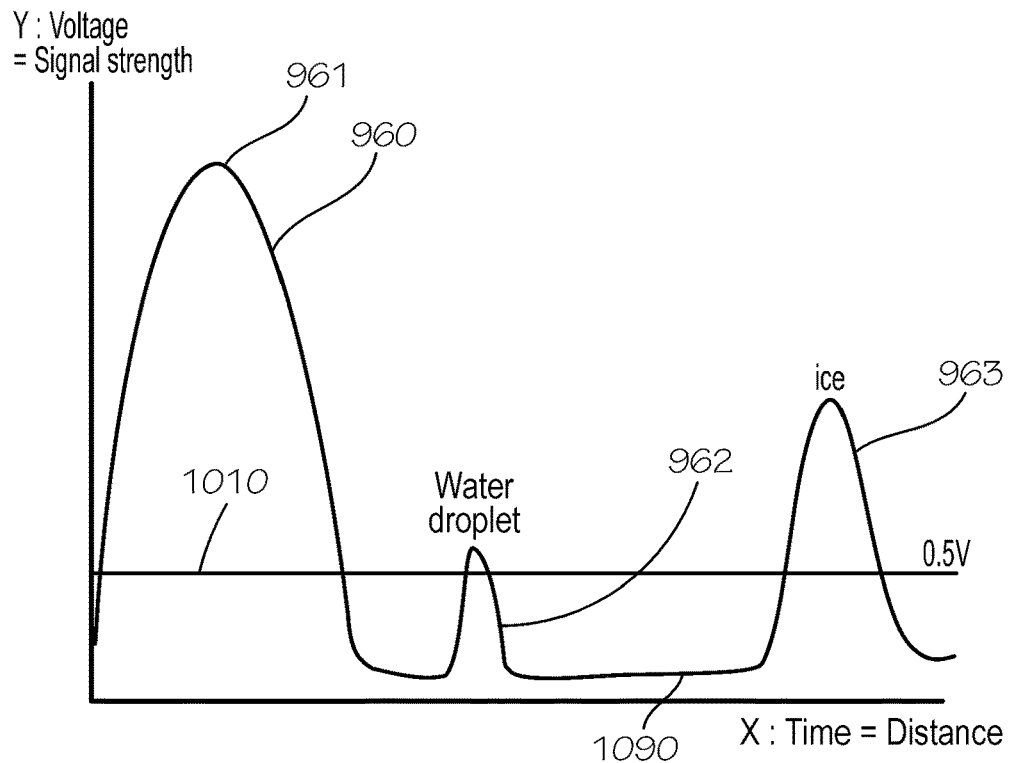
FIG. 10A is a first graphical representation of the return signal of FIG. 9 after conversion from an acoustic signal into an electrical signal.
Figure 10B:
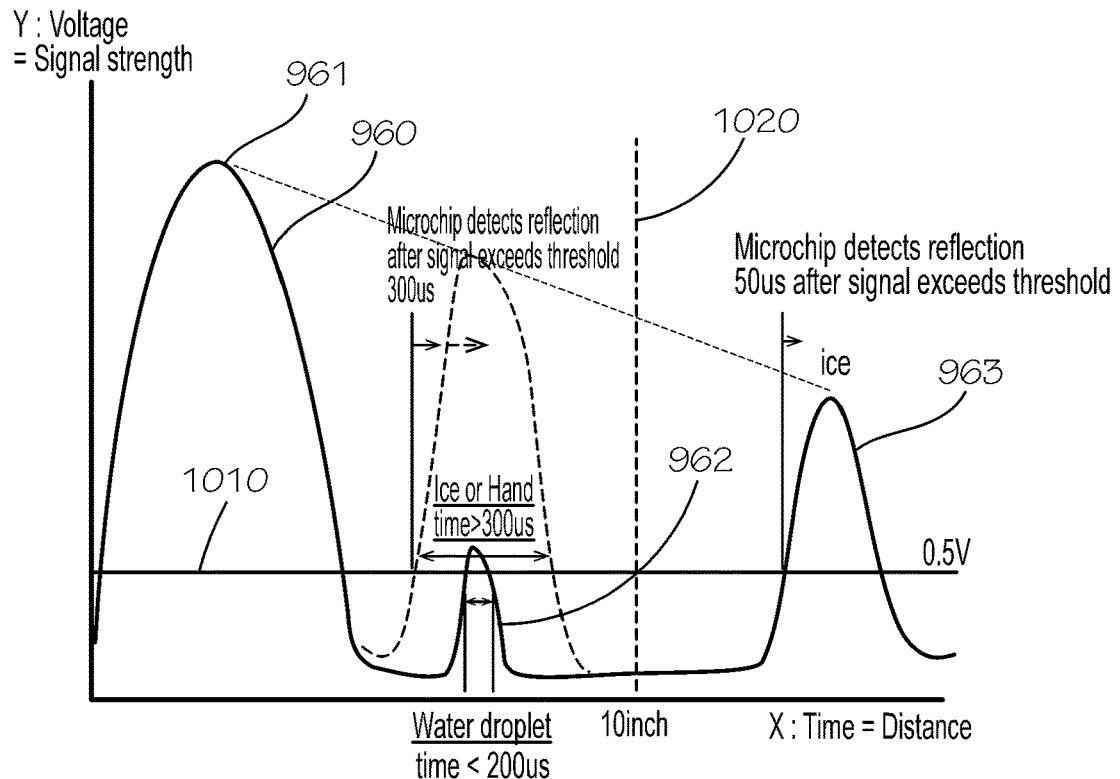
FIG. 10B is a second graphical representation of the return signal of FIG. 9 after conversion from an acoustic signal into an electrical signal and showing the filtering of the electrical signal.

As shown in FIGS. 10A and 10B, the water droplets 990 can cause the ice maker 110 to operate differently depending on how the ultrasonic bin sensor 290 is controlled—and in particular how the return signal 960 is processed. The peak 962 in the return signal 960 can represent the presence of scale or "slime" and not just the water droplets on the inner wall 750. In any case, as shown in FIG. 10A, a return signal 960 can comprise each of the peak 962 and the peak 963, each exceeding the threshold voltage 1010 of 0.5 V set to filter out a trough 1090 representing signal "noise." Because both of the peak 962 and the peak 963 exceed the threshold voltage 1010, however, both the peak 962 and the peak 963 can signal to the ice maker 110 that the ice has reached a height in the bin—or a corresponding distance 610 from the sensor to the top end 601 of the mound 600 of the ice cubes 490—exceeding that of a full storage bin 190 itself. This can happen because any water droplets 990 or other types of the substance 990 present on the inner wall 750 (shown in FIG. 7) are generally above any maximum desired ice bin level setting. This can occur even if the storage bin 190 is less than full of the ice cubes 490 because the ultrasonic bin sensor 290 itself cannot distinguish between the ice cubes 490 and any substance 990 on the inner wall 750 or the inner wall 750 itself of the ice maker 110. In some aspects, a threshold voltage setting of the controller can be set at or about 50% of the return signal 960 at 30 inches from the ultrasonic bin sensor 290 or the maximum ice detection distance 610. In other aspects, a threshold voltage setting of the controller can fall within a range between 40% and 50% of a strength of the return signal 960 at such a distance 610. In other aspects, a threshold voltage setting of the controller can fall within a range between 50% and 60% of a strength of the return signal 960 at such a distance 610. In other aspects, a threshold voltage setting of the controller can fall within a range between 30% and 60% of a strength of the return signal 960 at such a distance 610.

The ice maker 110, however, can be configured to distinguish between various components of the return signal 960 captured by the ultrasonic bin sensor 290. As shown in FIG. 10B, the return signal 960, once converted from an acoustic pulse into an electrical voltage, can effectively be filtered based on the distance of the object sensed and the strength of the signal. In some aspects, as shown, inside a time range corresponding to the distance 610 measuring less than or equal to 10 inches, a 300 microsecond filter can be used, and outside a time range corresponding to the distance 610 measuring greater than 10 inches a 50 microsecond filter can be used. A distance threshold 1020 can define what filter or time delay is used. More specifically, a portion of the return signal 960 formed by the measurement of an object distance (i.e., an X-axis dimension in the chart on FIG. 10B) to objects closer than the distance threshold 1020 can be filtered using a first filter, and a portion of the return signal 960 formed by the measurement of objects further than the distance threshold 1020 can be filtered using a second filter. The 50 microsecond filter can be used especially to avoid electrical noise from any source in or around the ice machine 100. Based on actual test measurements, a return signal from the mound 600 of the ice cubes 490 as stored in the storage bin 190 will generally exceed the threshold voltage 1010 for greater than 300 microseconds, while a return signal from water droplets, scale, or slime will typically exceed the threshold voltage 1010 for no more than approximately 200 microseconds. Therefore, in some aspects, the filter can be reduced to any value approaching 200 microseconds or even below (e.g., 175 microseconds, 200 microseconds, 225 microseconds, 250 microseconds, or 275 microseconds) with simply an increased risk of noise as the filter is reduced. In some aspects, ranges of values above or below 300 microseconds including ranges bounded by the aforementioned filter values (e.g., in a range of 250 to 300 microseconds) can be used. A user's hand, if caught within the viewing cone 710, similar to ice will generally exceed the threshold voltage 1010 for greater than 300 microseconds. Setting the filter at 300 microseconds in the first 10 inches (254 millimeters) from the ultrasonic bin sensor 290 can reduce the risk of false alarms, such as resulting from the ultrasonic bin sensor 290 sensing a full bin when it is actually sensing a larger amount of the substance 990 than usual on the inner wall 750. In addition, where a position of the ice maker 110 exposes a vertical or horizontal surface or edge of a wall of the storage bin 190, the resulting electrical noise in the return signal can similarly be filtered out by adjusting parameters of the ultrasonic bin sensor 290 or a controller 1130 (shown in FIG. 11) described herein, both of which can together form a bin control system.

Once the ultrasonic bin sensor 290 senses that a voltage of the return signal 960 is above the threshold voltage 1010, a controller—here, the bin controller 1130—can start a counter or timer configured to measure the length of time that the voltage remains above the threshold voltage 1010. If the voltage of the return signal 960 drops below the threshold voltage 1010 before the 300 or 50 microsecond time delay has passed, the controller 1130 can ignore that component of the return signal 960. If the voltage of the return signal 960 stays above the threshold voltage 1010 long enough (i.e., past the time/distance range corresponding to the one time delay or the other), the controller 1130 via the ultrasonic bin sensor 290 can then "see" the object as ice and then send a corresponding signal to the ice maker via the main controller 232 to turn an ice production setting of the ice machine to ON or OFF based on how the board is programmed and based on the selected control board setting 1-5. In some aspects, the controller 1130 can be configured to use or process only one return signal 960. In some aspects, the controller 1130 can be configured to use a minimum number of two or more return signals 960 or a single signal with the multiple peaks 961,962,963 as described herein.

The ultrasonic bin sensor 290, in electrical communication with the controller 1130, can be configured to emit a specific number of acoustic pulses in a given time period. In some aspects, the acoustic pulses can be sent by the ultrasonic bin sensor 290 every 200 milliseconds. In some aspects, the acoustic pulses can be sent more or less frequently. In some aspects, the ultrasonic bin sensor 290 can emit 5 pulses in the chosen interval-200 milliseconds here. In other aspects, the ultrasonic bin sensor 290 can emit a greater number of pulses, but increasing the number of pulses to certain levels (to 16 pulses, for example) can under certain conditions impact the ability of the controller 1130 to filter out noise and the aforementioned transmission signal. Because of the adaption of the controller 1130 and the ultrasonic bin sensor 290 described herein, the ice maker 110 can effectively distinguish between an acoustic "signature" created by the mound 600 of the ice cubes 490 inside the storage bin 190 and an acoustic "signature" created by any substance 990 on the inner wall 750—or any material elsewhere on the ice machine 100 having a similar effect. The peak 962 resulting from detection of the substance 990 will generally be too weak or too short in duration (or both) to appear as a mound of ice. In contrast, the peak 963 resulting from detection of the mound 600 will generally be strong enough to appear as ice, thereby causing the controller 1130 and the main controller 232 of the ice maker 110 to halt ice production once the mound 600 reaches the desired level.

Figure 11:
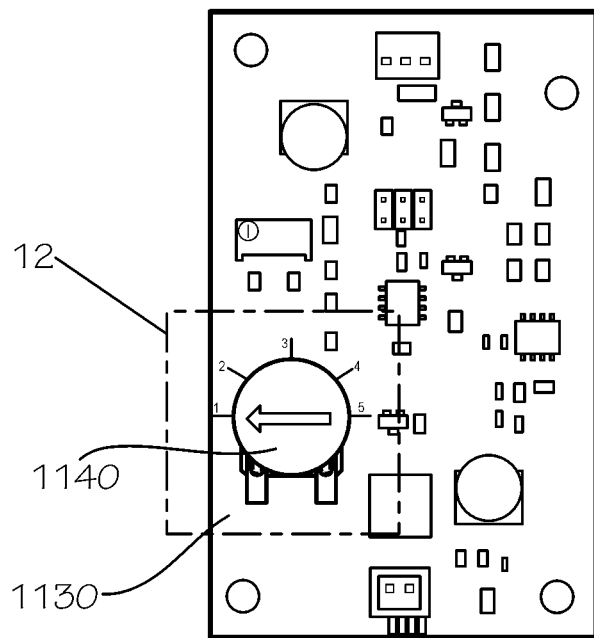
FIG. 11 is a plan view of a controller interfacing with the ultrasonic bin sensor of FIG. 2A.
Figure 12:
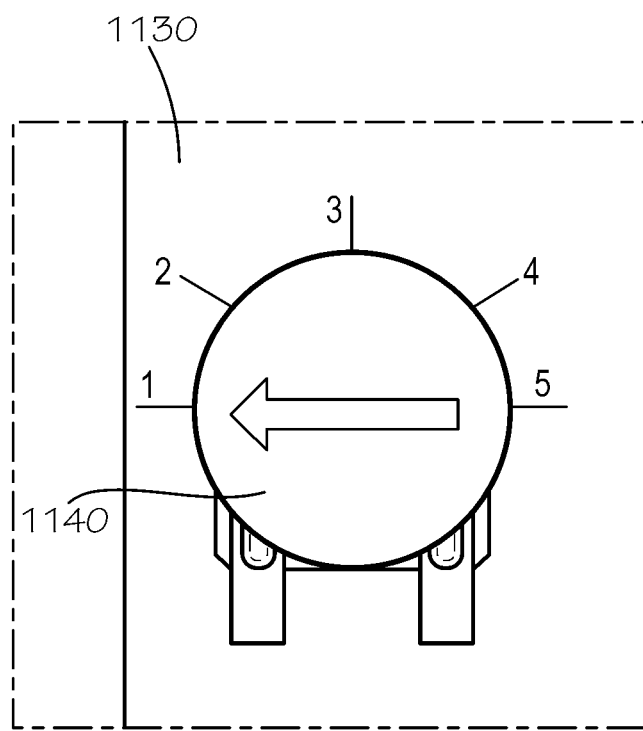
FIG. 12 is a detail plan view of an adjustor of the controller of FIG. 11.
Figures 13, 14:
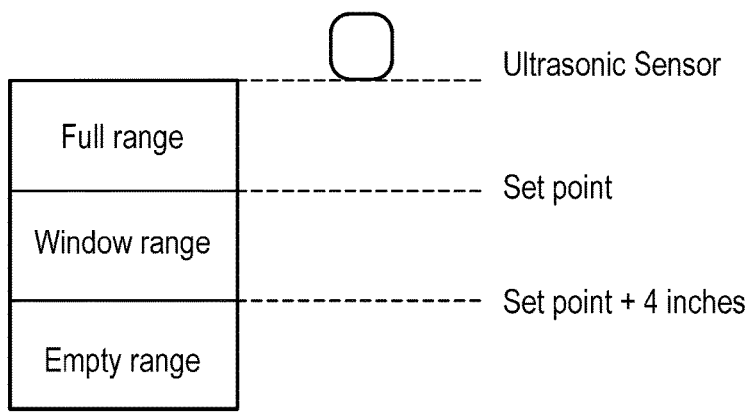
FIG. 13 is a table of settings of the controller of FIG. 11.
FIG. 14 is a graphical representation of three distance ranges associated with a bin control state of the controller of FIG. 11.

As shown in FIGS. 11-13, the shut-off height, which can correspond to the level position B (shown in FIG. 6), can be adjusted to any one of a number of bin control settings by means of an adjustor 1140, which can comprise a dial fit over or incorporated into a potentiometer mounted to the controller 1130. In some aspects, the controller 1130 can be a separate bin control board as shown. In some aspects, the controller 1130 can be incorporated into the main controller 232. In some aspects, as shown in FIG. 12, the adjustor 1140 can be positioned in any one of five different bin control settings, which can be labeled 1, 2, 3, 4, and 5 as shown. In other aspects, the adjustor 1140 can have less than or more than five bin control settings. As reflected in the table shown in FIG. 13, some users may install an ice dispenser unit (not shown) under the ice maker 110. The ice dispenser, while configured for more automated dispensing of ice—by pressing a lever instead of manually removing ice with a scoop—can otherwise be considered another example of the storage bin 190.

As shown in FIG. 14, the controller 1130 can be configured to recognize three signal ranges: full, window, and empty. The setting or set point (i.e., 1, 2, 3, 4, or 5) of the adjustor 1140 of the controller 1130 can correspond to a beginning of the "full" range, also corresponding to the ice detection distance 610. The "empty" range can begin 4 inches before the set point—or at any other offset distance from the set point as a user may desire. The "window" range can be the range between the "full" and "empty" ranges where, to prevent short cycling of the ice maker 110, the controller 1130 does not change the state of the bin control. For example and without limitation, more specifically the controller 1130 can be configured to change the bin control state to "full" after the return signal 960 stays in the "full" range for two seconds. The controller 1130 can change the bin control state to "empty" if the signal stays in the "empty" range for 30 seconds. Again, in the "window" range the controller 1130 can be configured to not change the bin control state.

Figure 15:
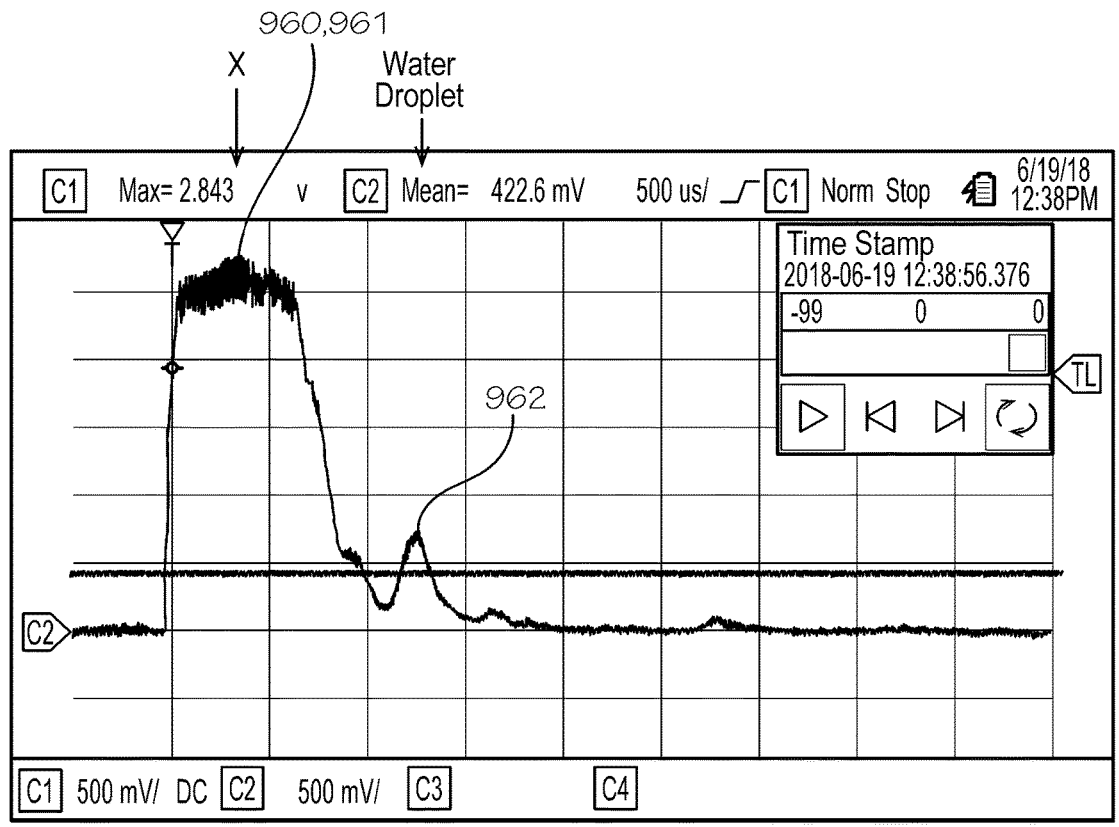
FIG. 15 is a graphical representation of a return signal of the ultrasonic bin sensor of FIG. 2A as it might appear on measuring equipment such as an oscilloscope or the equivalent.

FIG. 15 shows test data representative of a return signal from the ultrasonic bin sensor 290 with water droplets 990 (shown in FIG. 9) on the inner wall 750 (shown in FIG. 7) and no ice cubes 490 in the storage bin 190 or its equivalent. The mark X shows the transmission signal from the ultrasonic bin sensor, which can correspond to the peak 961 of the return signal 960, and the next largest peak, which can correspond to the peak 962, represents the presence of the water droplets 990.

Figures 16, 17:
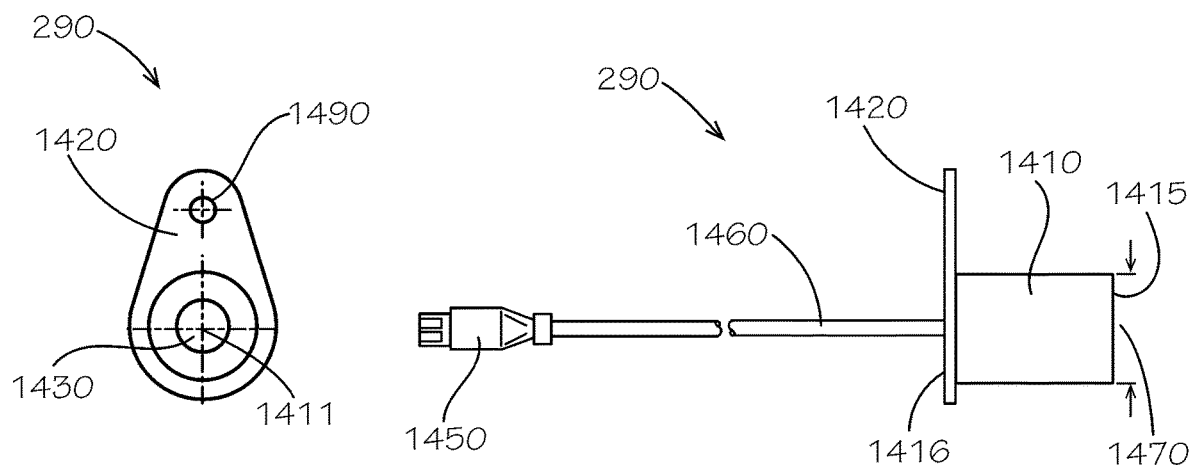
FIG. 16 is a bottom view of the ultrasonic bin sensor of FIG. 2A.
FIG. 17 is a side view of the ultrasonic bin sensor of FIG. 2A.

FIGS. 16 and 17 show the structure of an exemplary ultrasonic bin sensor 290, which can comprise a body 1410 secured by a single fastener (not shown) through a hole 1490 defined in a mounting flange 1420. The body 1410 can define an axis 1411, the first end 1415, and a second end 1416 distal from the first end 1415. A diameter 1470 of the body 1410 can be sized to fit within the opening defined in the compressor base 226 (shown in FIG. 7). A connector 1450 can connect the ultrasonic bin sensor 290 to the controller 1130 (shown in FIG. 11) for transmission of the original ultrasonic pulse and the return signal 960 through a lead wire 1460.

Figure 18:
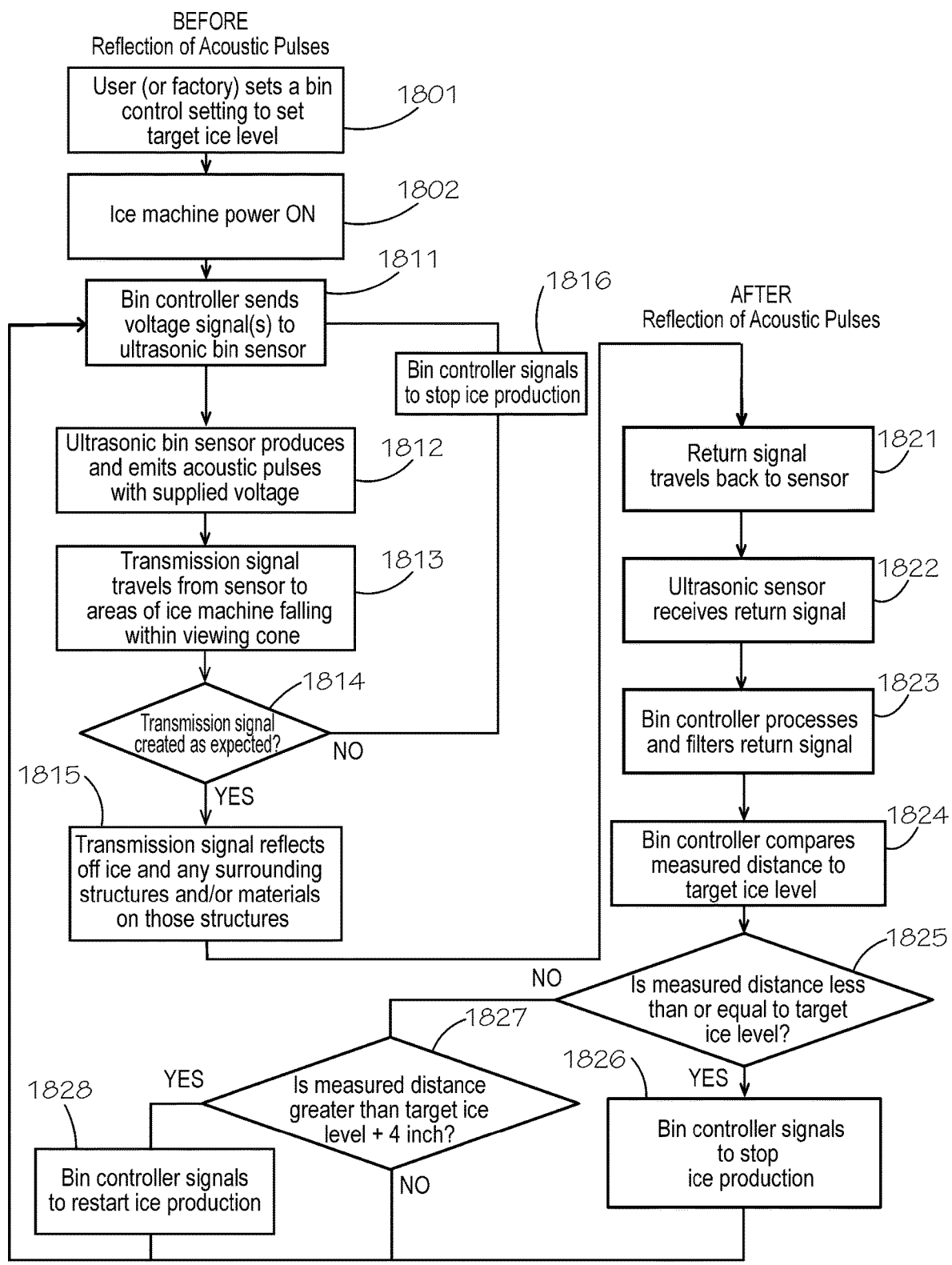
FIG. 18 is a flowchart for operation of the ultrasonic bin sensor of FIG. 2A.

FIG. 18 shows a flowchart for operation of the ultrasonic bin sensor 290. A method of detecting an ice level inside a storage bin 190 can comprise the steps 1801-1828. Introductory steps 1801 and 1802 can occur before operation of the ultrasonic bin sensor 290 begins. A step 1801 can comprise a user (or the factory) adjusting or setting a bin control setting (from bin control settings 1 to 5, for example) to set a target ice level. A step 1802 can comprise turning the ice machine or ice maker 110 power ON.

Subsequent steps 1811-1816 can commence with operation of the ultrasonic bin sensor 290. A step 1811 can comprise the bin controller 1130 sending a voltage signal or signals to the ultrasonic bin sensor 290 at predetermined time intervals (e.g., every 200 milliseconds). A step 1812 can comprise the ultrasonic bin sensor 290 producing and emitting acoustic pulses with the voltage supplied by the bin controller 1130. A step 1813 can comprise the transmission signal travelling from the ultrasonic bin sensor 290 to the ice mound 600 in the storage bin 190 and surrounding areas falling within the viewing cone 710. A step 1814 can comprise the bin controller determining if the transmission signal is formed as suspected, i.e., whether the ultrasonic sensor is forming a proper transmission signal or even forming a transmission signal at all. In the step 1814, if the transmission signal is as expected, a step 1815 can commence. If the transmission signal is not as expected or is not detected at all, a step 1816 can commence in which the bin controller 1130 can signal to the bin controller—or the bin controller 1130 can simply detect by the shape or absence of the transmission signal—and the bin controller 1310 can signals to the main controller to stop ice production and then return to the step 1811. The step 1815 can comprise the transmission signal reflecting off ice such as in the form of the ice mound 600 and any surrounding structures and/or materials on those structures.

Steps 1821-1828 can commence after reflection of the transmission signal. Specifically, a step 1821 can comprise the return signal 960 travelling back to the ultrasonic bin sensor 290. A step 1822 can comprise the ultrasonic sensor 290 receiving the return signal 960. A step 1823 can comprise the bin controller 1130 processing the return signal 960 by, for example, filtering out the noise peaks 962 and identifying a measured distance to the "ice" peaks 963 that remain. A step 1824 can comprise the bin controller 1130 comparing the measured distance to the target ice level or ice detection distance 610 for a full storage bin 190 (or a bin at the desired ice level, which could be more or less than "full"). In a step 1825, if the measured distance is less than or equal to the target ice level or ice detection distance 610 (i.e., the bin has reached the "full" level position), the bin controller 1130 can send a signal to the main controller 232 to stop ice production and then loop back to the step 1811. If the measured distance is not less than or equal to the target ice level or ice detection distance 610, a subsequent step 1827 can comprise the bin controller 1130 determining whether the measured distance if greater than the target ice level plus 4 inches. If the answer is YES, the bin controller 1130 can signal to the main controller 232 to restart ice production and then loop back to the step 1811.

The systems and methods disclosed herein are particularly adjusted for use with ice-makers configured to produce ice in the form of the discrete ice cubes 490—i.e., "cuber" type ice machines, but can be adjusted for use with other forms of use including, for example and without limitation, finely cut flaked ice, roughly cut "cubelet" flaked ice, iced formed inside trays or molds, and other forms of ice.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. An ice machine comprising:
   an ultrasonic bin sensor comprising a lens, the lens configured to face an interior cavity of a storage bin and measure a level of ice sorted inside the storage bin; and
   a controller in electrical communication with the ultrasonic bin sensor and configured to control the ultrasonic bin sensor;
   wherein the controller is configured to:
      filter out a portion of a return signal of the ultrasonic bin sensor below a threshold voltage as part of controlling the level of ice stored inside the storage bin; and
      filter out a portion of the return signal exceeding the threshold voltage for a length of time equal to or less than a predetermined time delay as part of controlling the level of ice stored inside the storage bin.

2. The ice machine of claim 1, wherein a lowermost portion of the ultrasonic bin sensor is offset above a bottom maker end of an ice maker of the ice machine.

3. The ice machine of claim 1, wherein the time delay is in a range of 175 to 350 microseconds.

4. The ice machine of claim 1, wherein filtering out the portion of the return signal exceeding the threshold voltage for the length of time equal to or less than the time delay comprises filtering out the portion of the return signal exceeding the threshold voltage for the length of time equal to or less than the time delay when the return signal corresponds to a first object distance that is closer than a distance threshold.

5. The ice machine of claim 4, wherein:
   the time delay is a first time delay; and
   the controller is further configured to filter out a portion of the return signal exceeding the threshold voltage for a length of time equal to or less than a predetermined second time delay when the return signal corresponds to a first object distance that is further than a distance threshold.

6. A bin control system for an ice machine, the system comprising:
   an ultrasonic bin sensor comprising a body defining a first end and a second end distal from the first end, the first end comprising a lens; and
   a controller in electrical communication with the ultrasonic bin sensor and configured to control the ultrasonic bin sensor, wherein the controller is configured to:
      filter out a portion of a return signal of the ultrasonic bin sensor below a threshold voltage as part of controlling a level of ice stored inside a storage bin of the ice machine; and
      filter out a portion of the return signal exceeding the threshold voltage for a length of time equal to or less than a predetermined time delay as part of controlling the level of ice stored inside the storage bin.

7. The system of claim 6, wherein the controller comprises an adjustor and defines a plurality of bin control settings, the plurality of bin control settings configured to regulate an ice detection distance measured from the lens of the ultrasonic bin sensor to a level position defined by a desired level of ice in a storage bin.

8. The system of claim 6, wherein a signal emitted by the ultrasonic bin sensor defines a viewing cone defining a viewing angle of 80 degrees, plus or minus 5 degrees.

9. The system of claim 6, wherein a threshold voltage setting of the controller falls within a range between 30% and 60% of a strength of the return signal at a distance of 30 inches.

10. The system of claim 6, wherein the time delay measures in a range of 175 to 350 microseconds.

11. The system of claim 7, wherein filtering out the portion of the return signal exceeding the threshold voltage for the length of time equal to or less than the time delay comprises filtering out the portion of the return signal exceeding the threshold voltage for the length of time equal to or less than the time delay when the return signal corresponds to a first object distance that is closer than a distance threshold.

12. The system of claim 11, wherein:
the time delay is a first time delay, and
the controller is further configured to filter out a portion of the return signal exceeding the threshold voltage for a length of time equal to or less than a predetermined second time delay when the return signal corresponds to a first object distance that is further than a distance threshold.

13. The system of claim 12, wherein the second time delay differs from the first time delay.

14. The system of claim 13, wherein the first time delay measures in a range of 175 to 350 microseconds.

15. A method of using an ice machine, the method comprising:
transmitting an acoustic pulse from an ultrasonic bin sensor of an ice maker of the ice machine into a storage bin of the ice machine, the ultrasonic bin sensor mounted to a body of the ice maker, the acoustic pulse initiated by the ultrasonic bin sensor in electrical communication with a controller;
receiving a return signal resulting from a reflection of the acoustic pulse off surfaces of materials present inside an interior cavity of the ice machine within range of the ultrasonic bin sensor;
converting the return signal from an acoustic signal into an electrical signal;
filtering out a portion of the return signal that exceeds a threshold voltage for a length of time equal to or less than a predetermined time delay; and
switching off production of the ice maker of the ice machine when a portion of the return signal exceeds a threshold voltage for a length of time greater than the time delay.

16. The method of claim 15, wherein the time delay is in a range of 175 to 350 microseconds.

17. The method of claim 15, wherein filtering out the portion of the return signal that exceeds the threshold voltage for the length of time equal to or less than the time delay comprises:
filtering out the portion of the return signal exceeding the threshold voltage for the length of time equal to or less than the time delay when the return signal corresponds to a first object distance that is closer than a distance threshold, the time delay being a first time delay; and
filtering out a portion of the return signal exceeding the threshold voltage for a length of time equal to or less than a predetermined second time delay when the return signal corresponds to a first object distance that is further than a distance threshold.

18. The method of claim 17, wherein the second time delay differs from the first time delay.

19. The method of claim 15, wherein a lowermost portion of the ultrasonic bin sensor is offset above a bottom maker end of the ice maker and also offset above a top bin end of the storage bin.

20. The method of claim 15, further comprising detecting, in the return signal, an acoustic signature of the one of scale resulting from hard water, slime resulting from bacteria growth, mold, and water droplets on an inner wall of the ice maker.

21. An ice machine comprising:
an ice maker comprising:
an ultrasonic bin sensor mounted to a body; and
a controller in electrical communication with the ultrasonic bin sensor and configured to control the ultrasonic bin sensor; and
a storage bin coupled to the ice maker and sized to receive ice, a lens of the ultrasonic bin sensor facing an interior cavity of the storage bin;
wherein the controller is configured to:
filter out a portion of a return signal of the ultrasonic bin sensor below a threshold voltage as part of controlling a level of ice stored inside the storage bin; and
filter out a portion of the return signal exceeding the threshold voltage for a length of time equal to or less than a predetermined time delay as part of controlling the level of ice stored inside the storage bin.

22. The ice machine of claim 21, wherein the time delay is in a range of 175 to 350 microseconds.

23. The ice machine of claim 21, wherein filtering out the portion of the return signal exceeding the threshold voltage for the length of time equal to or less than the time delay comprises filtering out the portion of the return signal exceeding the threshold voltage for the length of time equal to or less than the time delay when the return signal corresponds to a first object distance that is closer than a distance threshold.

24. The ice machine of claim 23, wherein:
the time delay is a first time delay; and
the controller is further configured to filter out a portion of the return signal exceeding the threshold voltage for a length of time equal to or less than a predetermined second time delay when the return signal corresponds to a first object distance that is further than a distance threshold.

* * * * *